United States Patent
Koga et al.

[11] Patent Number: 5,984,430
[45] Date of Patent: Nov. 16, 1999

[54] HYDRAULIC BRAKING SYSTEM FOR A VEHICLE

[75] Inventors: Keiichi Koga; Kazuya Watanabe; Hiroaki Takeuchi, all of Toyota, Japan

[73] Assignee: Aisin Seiki Kabushiki Kaisha, Kariya, Japan

[21] Appl. No.: 08/803,639

[22] Filed: Feb. 21, 1997

[30] Foreign Application Priority Data

Feb. 21, 1996 [JP] Japan .................................. 8-034058
Jun. 20, 1996 [JP] Japan .................................. 8-160308

[51] Int. Cl.⁶ .................................. B60T 8/32; B60T 8/48
[52] U.S. Cl. ..................... 303/116.1; 303/11; 303/116.2
[58] Field of Search ......................... 303/116.1, 116.2, 303/113.1, 113.2, 900

[56] References Cited

U.S. PATENT DOCUMENTS

| | | |
|---|---|---|
| 4,878,715 | 11/1989 | Toda . |
| 5,441,336 | 8/1995 | Takeuchi . |
| 5,547,266 | 8/1996 | Beck et al. ............................. 303/116.1 |
| 5,584,540 | 12/1996 | Takeuchi et al. ..................... 303/116.1 |
| 5,707,116 | 1/1998 | Tsuru et al. ........................... 303/116.2 |
| 5,779,328 | 7/1998 | Mergenthaler et al. ............. 303/116.1 |

FOREIGN PATENT DOCUMENTS

| | | |
|---|---|---|
| 40 00 837 | 7/1991 | Germany . |
| 4127040 | 2/1993 | Germany .............................. 303/116.2 |
| 42 40 835 | 1/1994 | Germany . |
| 2 239 913 | 7/1991 | United Kingdom . |
| 92/18363 | 10/1992 | WIPO ................................. 303/116.1 |

Primary Examiner—Matthew C. Graham
Attorney, Agent, or Firm—Burns, Doane, Swecker & Mathis, LLP

[57] ABSTRACT

A hydraulic braking system for a vehicle having a wheel includes a wheel brake cylinder operatively connected to the wheel for applying braking force to the wheel, and a master cylinder for generating hydraulic pressure in response to depression of a brake pedal and for supplying the hydraulic pressure to the wheel brake cylinder. The master cylinder is connected to the wheel brake cylinder via a first conduit. The wheel brake cylinder is connected to a reservoir for storing brake fluid via a second conduit. A normally closed solenoid valve is disposed in the second conduit. A hydraulic pressure pump is disposed in the first conduit and includes an inlet connected to the master cylinder and an outlet connected to the wheel brake cylinder. A third conduit connects the second conduit at a point between the normally closed solenoid valve and the reservoir to the first conduit at a point between the inlet of the hydraulic pressure pump and the master cylinder.

13 Claims, 7 Drawing Sheets

HYDRAULIC BRAKING SYSTEM FOR A VEHICLE

FIELD OF THE INVENTION

The present invention relates to a hydraulic braking system for a vehicle. More particularly, the present invention pertains to a brake pressure control device for controlling the hydraulic pressure in a wheel brake cylinder to prevent the wheel from being locked (anti-skid control) when the brake pedal is depressed, and for supplying hydraulic pressure to the wheel brake cylinder and controlling the hydraulic pressure in the wheel brake cylinder even if the brake pedal is not depressed.

BACKGROUND OF THE INVENTION

A conventional hydraulic braking system is disclosed in U.S. Pat. No. 4,878,715 published on Nov. 7, 1989. As shown in FIG. 3 of this patent, the hydraulic braking system includes a wheel brake cylinder and a master cylinder. The wheel brake cylinder is operatively connected to a wheel of a vehicle to apply braking force to the wheel. The master cylinder generates a hydraulic pressure in response to depression of a brake pedal and supplies the hydraulic pressure to the wheel brake cylinder. The master cylinder is connected to the wheel cylinder via a first conduit and a normally open solenoid valve is disposed in the first conduit. The wheel brake cylinder is connected via a second conduit to a reservoir storing brake fluid discharged from the wheel brake cylinder. A normally closed solenoid valve is disposed in the second conduit. The reservoir is connected via a third conduit to a junction portion of the first conduit between the normally open solenoid valve and the master cylinder. A hydraulic pressure pump is disposed in the third conduit. An inlet of the hydraulic pressure pump is connected to the reservoir and an outlet of the hydraulic pressure pump is connected to the junction portion of the first conduit.

A change over valve is disposed in the first conduit between the junction portion and the master cylinder. The change over valve is positionable in a first position in which the master cylinder is connected to the normally open solenoid valve and the inlet of the hydraulic pressure pump is disconnected from the master cylinder, and a second position in which the inlet of the hydraulic pressure pump is connected to the master cylinder and the master cylinder is disconnected from the normally open solenoid valve. When the change over valve is positioned in the second position, the hydraulic pressure pump draws brake fluid from a master reservoir via the master cylinder and pumps the brake fluid to the wheel brake cylinder so that hydraulic pressure can be supplied to the wheel brake cylinder even if the brake pedal is not depressed.

However, since this hydraulic braking system includes the change over valve for supplying hydraulic pressure to the wheel brake cylinder when the brake pedal is not depressed, the system is expensive and rather large.

SUMMARY OF THE INVENTION

A need exists, therefore, for a hydraulic braking system which addresses at least the foregoing drawbacks in the prior art.

According to one aspect of the present invention, a hydraulic braking system for a vehicle having a wheel comprises a wheel brake cylinder operatively connected to the wheel for applying braking force thereto and a master cylinder for generating a hydraulic pressure in response to depression of a brake pedal and supplying the hydraulic pressure to the wheel brake cylinder. The master cylinder is connected to the wheel brake cylinder via a first conduit. The wheel brake cylinder is connected to a reservoir for storing brake fluid via a second conduit. A normally closed solenoid valve is disposed in the second conduit. A hydraulic pressure pump is disposed in the first conduit and includes an inlet connected to the master cylinder and an outlet connected to the wheel brake cylinder. A third conduit connects the second conduit at a point between the normally closed solenoid valve and the reservoir to the first conduit at a point between the inlet of the hydraulic pressure pump and the master cylinder.

According to another aspect of the present invention, a hydraulic braking system for a vehicle includes a first wheel brake cylinder operatively connected to a first wheel for applying braking force to the first wheel, a second wheel brake cylinder operatively connected to a second wheel for applying braking force to the second wheel, and a master cylinder for generating hydraulic pressure in response to depression of a brake pedal and for supplying the hydraulic pressure to the first and second wheel brake cylinders. A first conduit connects the master cylinder to the first and second wheel brake cylinders. The first conduit includes a main conduit connected to the master cylinder, a first branch conduit branching from the main conduit and connected to the first wheel brake cylinder, and a second branch conduit branching from the main conduit and connected to the second wheel brake cylinder. A reservoir is provided for storing brake fluid, and a second conduit connects the first wheel brake cylinder to the reservoir. A third conduit connects the second wheel brake cylinder to the reservoir. A first normally closed solenoid valve is disposed in the second conduit and a second normally closed solenoid valve is disposed in the third conduit. A hydraulic pressure pump is disposed in the main conduit of the first conduit and includes an inlet connected to the master cylinder and an outlet connected to the first and second wheel brake cylinders. A fourth conduit connects both the second conduit at a point between the first normally closed solenoid valve and the reservoir and the third conduit at a point between the second normally closed solenoid valve and the reservoir to the main conduit of the first conduit at a point between the inlet of the hydraulic pressure pump and the master cylinder.

BRIEF DESCRIPTION OF THE DRAWING FIGURES

The foregoing and additional features of the present invention will become more apparent from the following detailed description of several embodiments of the present invention considered with reference to the accompanying drawing figures in which like elements are designated by like reference numerals and wherein.

DETAILED DESCRIPTION OF THE PREFERRED EMBODIMENTS

Figure 1:
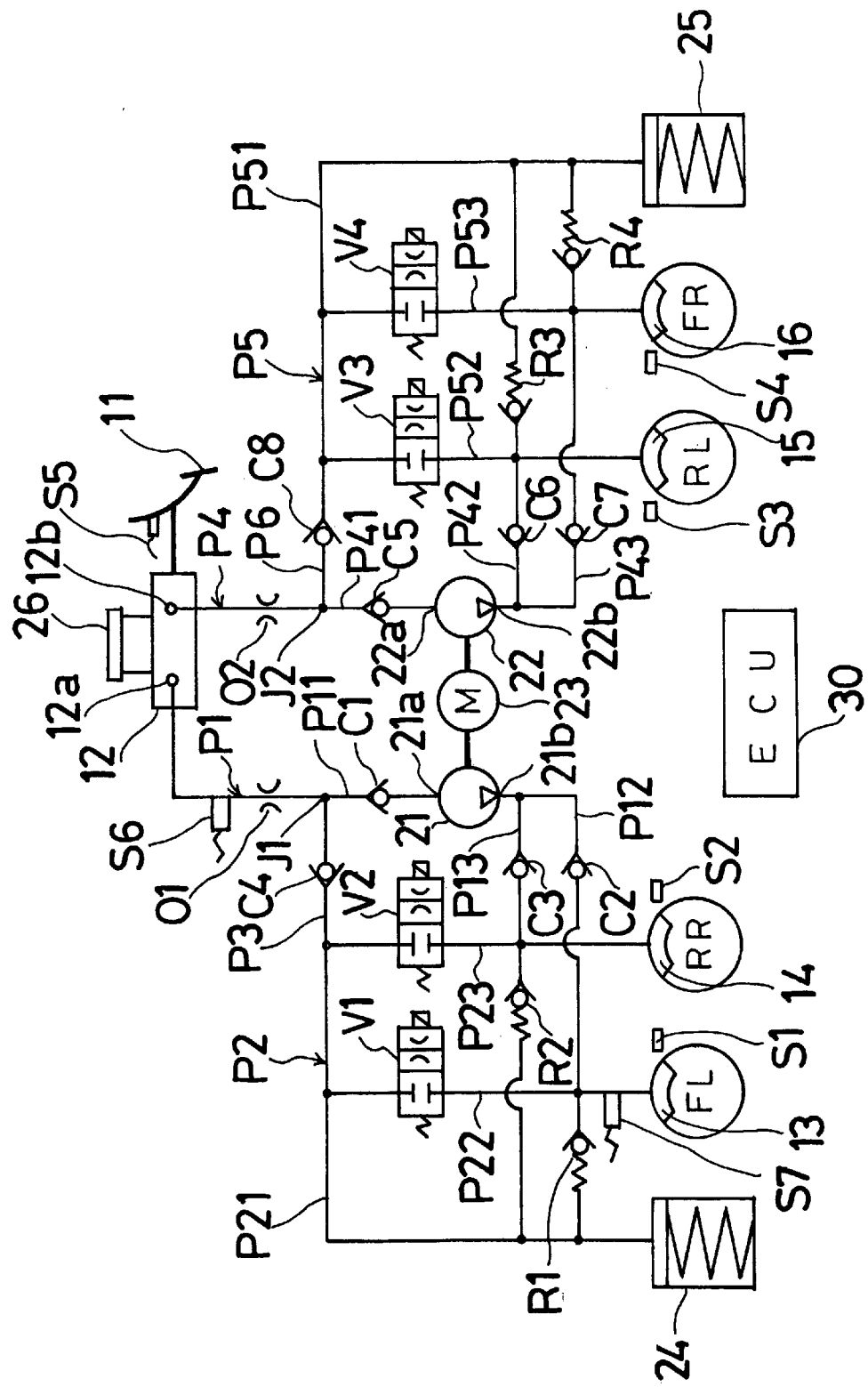
FIG. 1 is a schematic block diagram illustrating a hydraulic braking system according to a first embodiment of the present invention.

A hydraulic braking system according to a first embodiment of the present invention is illustrated in FIGS. 1–5. As shown in FIG. 1, the hydraulic braking system includes a master cylinder 12 that is connected to a brake pedal 11. The master cylinder 12 includes a pair of pressure chambers 12a, 12b connected to a master reservoir 26 that stores brake fluid. The master cylinder 12 generates hydraulic pressure in response to depression of the brake pedal 11.

One of the pressure chambers 12a in the master cylinder 12 is connected to a front left wheel brake cylinder 13 and a rear right wheel brake cylinder 14 via a first conduit P1. The wheel brake cylinders 13, 14 are operatively connected to a front left wheel FL corresponding to one of driven wheels and a rear right wheel RR corresponding to one of non-driven wheels to apply a braking force to the corresponding wheels FL, RR, respectively. The first conduit P1 includes a main conduit P11 and a pair of branch conduits P12, P13. The main conduit P11 is connected to the pressure chamber 12a, while the branch conduits P12, P13 branch from the main conduit P11 and are connected to the front left wheel FL and the rear right wheel RR, respectively.

The wheel brake cylinders 13, 14, are connected to a sub-reservoir 24 via a second conduit P2. The sub-reservoir 24 is different from and separate from the master reservoir 26. The sub-reservoir 24 stores brake fluid discharged from the wheel brake cylinders 13, 14.

The second conduit P2 includes a main conduit P21 and a pair of branch conduits P22, P23. The main conduit P21 is connected to the sub-reservoir 24. The branch conduits P22, P23 branch from the main conduit P21 and are connected to the front left wheel FL and the rear right wheel RR, respectively. Normally closed solenoid valves V1, V2 are disposed in the branch conduits P22, P23 of the second conduit P2 to control the hydraulic pressure in the wheel brake cylinders 13, 14 of the front left wheel FL and the rear right wheel RR, respectively.

A hydraulic pressure pump 21 or plunger pump is disposed in the main conduit P11 of the first conduit P1 and is driven by a motor 23. The inlet 21a of the pump 21 is connected to the pressure chamber 12a of the master cylinder 12 and the pump outlet 21b is connected to the wheel brake cylinders 13, 14.

A third conduit P3 connects the branch conduits P22, P23 of the second conduit P2 located between the solenoid valve V1, V2 and the sub-reservoir 24 with a junction portion J1 of the main conduit P11. The junction portion J1 is located between the inlet 21a of the pump 21 and the pressure chamber 12a of the master cylinder 12. Therefore, the pump 21 draws brake fluid from the sub-reservoir 24 via the third conduit P3 and pumps the brake fluid to the wheel brake cylinders 13, 14. The pump 21 also draws brake fluid from the master reservoir 26 via the pressure chamber 12a of the master cylinder 12 and pumps the brake fluid to the wheel brake cylinders 13, 14.

The solenoid valves V1, V2 are opened when it is necessary to decrease the hydraulic pressure in the wheel cylinders 13, 14. In other words, the solenoid valves V1, V2 are opened when the brake pedal 11 is released during normal braking or when the hydraulic pressure mode for the wheel brake cylinders 13, 14 is a decrease mode during the anti-skid control.

A check valve C1 serving as a suction valve is disposed in the main conduit P11 between the inlet 21a of the pump 21 and the junction portion J1 to prevent brake fluid in the pump 21 from flowing toward the junction portion J1. A first check valve C2 is disposed in the branch conduit P12 of the first conduit P1 to prevent the brake fluid in the wheel brake cylinder 13 from flowing into the wheel brake cylinder 14 via the branch conduits P12, P13. A second check valve C3 is disposed in the branch conduit P13 of the first conduit P1 to prevent the brake fluid in the wheel brake cylinder 14 from flowing into the wheel brake cylinder 13 via the branch conduits P12, P13. A check valve C4 is disposed in the third conduit P3 to prevent the hydraulic pressure generated by the pressure chamber 12a from being supplied to the sub-reservoir 24 via the third conduit P3 during depression of the brake pedal 11.

A relief valve R1 is connected between the branch conduit P12 and the sub-reservoir 24 and opens when the hydraulic pressure in the branch conduit P12 exceeds a predetermined upper limit. A relief valve R2 is also connected between the branch conduit P13 and the sub-reservoir 24 and opens when the hydraulic pressure in the branch conduit P13 exceeds the predetermined upper limit. A throttle O1 is disposed in the main conduit P11 between the junction portion J1 and the pressure chamber 12a. This makes it easier for the pump 21 to draw brake fluid from the sub-reservoir 24 than from the pressure chamber 12a of the master cylinder 12.

The other pressure chamber 12b of the master cylinder 12 is connected to a rear left wheel brake cylinder 15 and a front right wheel brake cylinder 16 via a fourth conduit P4. The wheel brake cylinders 15, 16 are operatively connected to a rear left wheel RL corresponding to the other non-driven wheel and a front right wheel FR corresponding to the other driven wheel to apply a braking force to the corresponding wheels RL, FR, respectively. The fourth conduit P4 includes a main conduit P41 and a pair of branch conduits P42, P43. The main conduit P41 is connected to the pressure chamber 12b. The branch conduits P42, P43 branch from the main conduit P41 and are connected to the rear left and front right wheels RL, FR, respectively.

The wheel brake cylinders 15, 16 are connected to a sub-reservoir 25 via a fifth conduit P5. The sub-reservoir 25 is different from and separate from the master reservoir 26. The sub-reservoir 25 stores brake fluid discharged from the wheel brake cylinders 15, 16.

The fifth conduit P5 includes a main conduit P51 and a pair of branch conduits P52, P53. The main conduit P51 is connected to the sub-reservoir 25. The branch conduits P52, P53 branch from the main conduit P51 and are connected to the rear left and front right wheels RL, FR, respectively. Normally closed solenoid valves V3, V4 are disposed in the branch conduits P52, P53 to control the hydraulic pressure in the wheel brake cylinders 15, 16 associated with the rear left and front right wheels RL, FR, respectively.

A hydraulic pressure pump 22 or plunger pump is disposed in the main conduit P41 of the fourth conduit P4 and is driven by the motor 23. The inlet 22a of the pump 22 is connected to the pressure chamber 12b of the master cylinder 12 and the outlet 22b of the pump 22 is connected to the wheel brake cylinders 15, 16.

A sixth conduit P6 connects the branch conduits P52, P53 of the fifth conduit P5 located between the solenoid valve V1, V2 and the sub-reservoir 25 with a junction portion J2 of the main conduit P51 that is located between the inlet 22a of the pump 22 and the pressure chamber 12b. Therefore, the pump 22 draws brake fluid from the sub-reservoir 25 via the sixth conduit P6 and pumps the brake fluid to the wheel brake cylinders 15, 16. The pump 22 also draws brake fluid from the master reservoir 26 via the pressure chamber 12b of the master cylinder 12 and pumps the brake fluid to the wheel brake cylinders 15, 16.

The solenoid valves V3, V4 are opened when it is necessary to decrease the hydraulic pressure in the wheel cylinders 15, 16. In other words, the solenoid valves V3, V4 are opened when the brake pedal 11 is released during normal braking or when the hydraulic pressure mode for the wheel brake cylinders 15, 16 is a decrease mode during the anti-skid control.

A check valve C5 serving as a suction valve is disposed in the main conduit P41 between the inlet 22a of the pump 22 and the junction portion J2 to prevent brake fluid in the pump 22 from flowing toward the junction portion J2. A check valve C6 is disposed in the branch conduit P42 to prevent brake fluid in the wheel brake cylinder 15 from flowing into the wheel brake cylinder 16 via the branch conduits P42, P43. A check valve C7 is disposed in the branch conduit P43 to prevent brake fluid in the wheel brake cylinder 16 from flowing into the wheel brake cylinder 15 via the branch conduits P42, P43. A check valve C8 is disposed in the sixth conduit P6 to prevent the hydraulic pressure generated by the pressure chamber 12b from being supplied to the sub-reservoir 25 via the sixth conduit P6 during depression of the brake pedal 11.

A relief valve R3 is connected between the branch conduit P42 and the sub-reservoir 25 and opens when the hydraulic pressure in the branch conduit P42 exceeds a predetermined upper limit. A relief valve R4 is connected between the branch conduit P43 and the sub-reservoir 25 and opens when the hydraulic pressure in the branch conduit P43 exceeds the predetermined upper limit. A throttle O2 is disposed in the main conduit P41 between the junction portion J2 and the pressure chamber 12b to thereby make it easier for the pump 22 to draw brake fluid from the sub-reservoir 25 than from the pressure chamber 12b of the master cylinder 12.

The above-described solenoid valves V1 to V4 and the motor 23 are electrically connected to an electronic controller 30. The electronic controller 30 controls the solenoid valves V1 to V4 and the motor 23. Wheel speed sensors S1 to S4 are provided at the wheels FR, FL, RL, RR to sense rotational speeds of the wheels (hereinafter referred to as wheel speeds), respectively. Wheel speed sensors S1 to S4 are electrically connected to the electronic controller 30 to supply sensing signals to the electronic controller 30.

A brake switch S5 operatively associated with the brake pedal 11 is also provided. The brake switch S5 is turned on when the brake pedal 11 is depressed and turned off when the brake pedal 11 is released. The brake switch S5 is electrically connected to the electronic controller 30. A M/C pressure sensor S6 is provided at the main conduit P11 of the first conduit P1 to sense the hydraulic pressure generated by the master cylinder 12 (hereinafter, referred to as the M/C pressure). A W/C pressure sensor S7 is provided at the branch conduit P12 of the first conduit P11 to sense the hydraulic pressure in the wheel brake cylinder 13 (hereinafter, referred to as the W/C pressure). The pressure sensors S6, S7 are electrically connected to the electronic controller 30. The M/C pressure sensor S6 may be provided at the main conduit P41 of the fourth conduit P4. The W/C pressure sensor S7 may be provided at the branch conduit P43 or may be provided at all of the branch conduits P12, P13, P42, P43.

Figure 2:
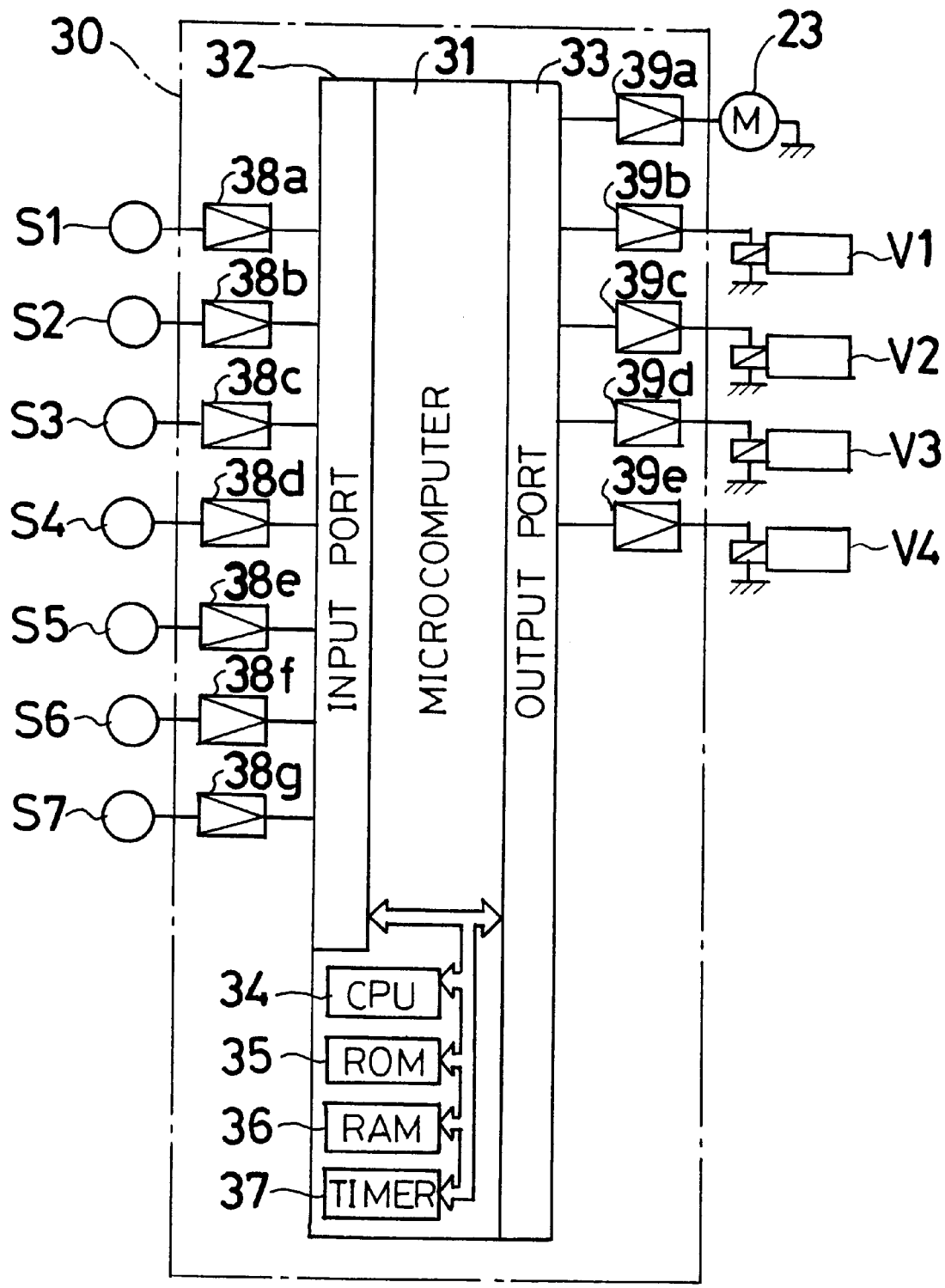
FIG. 2 is a block diagram illustrating the arrangement of the electronic controller shown in FIG. 1.

As shown in FIG. 2, the electronic controller 30 includes a microcomputer 31. The microcomputer 31 has a central processing unit or CPU 34, a read-only memory or ROM 35, a random access memory or RAM 36 and a timer 37, which are connected with an input port 32 and an output port 33 via a common bus to execute the input/output operations relative to external circuits. The various signals sensed by the wheel speed sensors S1 to S4, the brake switch S5 and the first and second pressure sensors S6, S7 are fed to the input port 32 via respective amplification circuits 38a to 38g and then to the CPU 34. Then, a control signal is output from the output port 33 to the motor 23 via a drive circuit 39a. Control signals are output from the output port 33 to the solenoid valves V1 to V4 via the respective drive circuits 39b to 39e. In the microcomputer 31, the ROM 35 memorizes a program corresponding to the flowcharts shown in FIGS. 3 and 4, the CPU 34 executes the program while the ignition switch (not shown) is closed, and the RAM 36 temporarily memorizes variable data necessary for executing the program.

The electronic controller 30 executes the program routines for an anti-skid control, a brake traction control, an automatic boost control during normal braking and an automatic braking control on the basis of the signals input from the various sensors S1 to S7.

Figure 3:
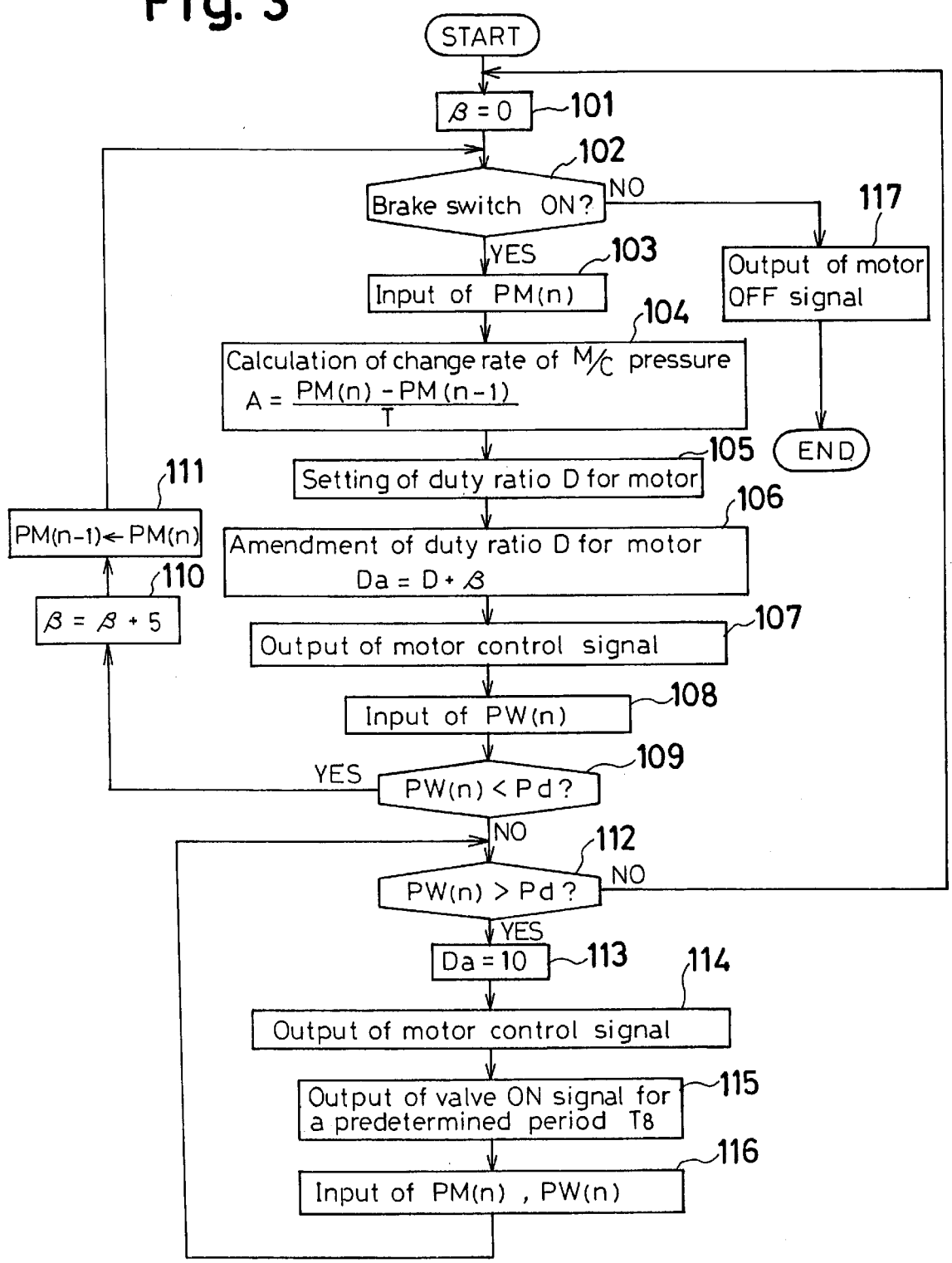
FIG. 3 is a flowchart showing the operation of the automatic boost control during the normal brake operation of the electronic controller shown in FIG. 2.

The program routine executed by the electronic controller 30 for the automatic boost control during the normal brake is explained with reference to FIG. 3.

In Step 101, a variable β for amending a duty ratio D for the motor 23 is reset and in Step 102, it is determined if the brake switch is turned ON or if the brake pedal 11 is depressed. If so, the program proceeds to Step 103 where the M/C pressure in the present time PM(n) is input from the M/C pressure sensor S6 and is memorized or modified. Then, the program proceeds to Step 104 where a change rate A of the M/C pressure is calculated on the basis of the present M/C pressure PM(n), the preceding M/C pressure PM(n−1) input from the M/C pressure sensor S6 during the preceding time, and a period T which is the difference between the present time and the preceding time. That is, the change rate A of the M/C pressure is calculated as A={PM(n)−PM(n−1)}/T.

Figure 4:
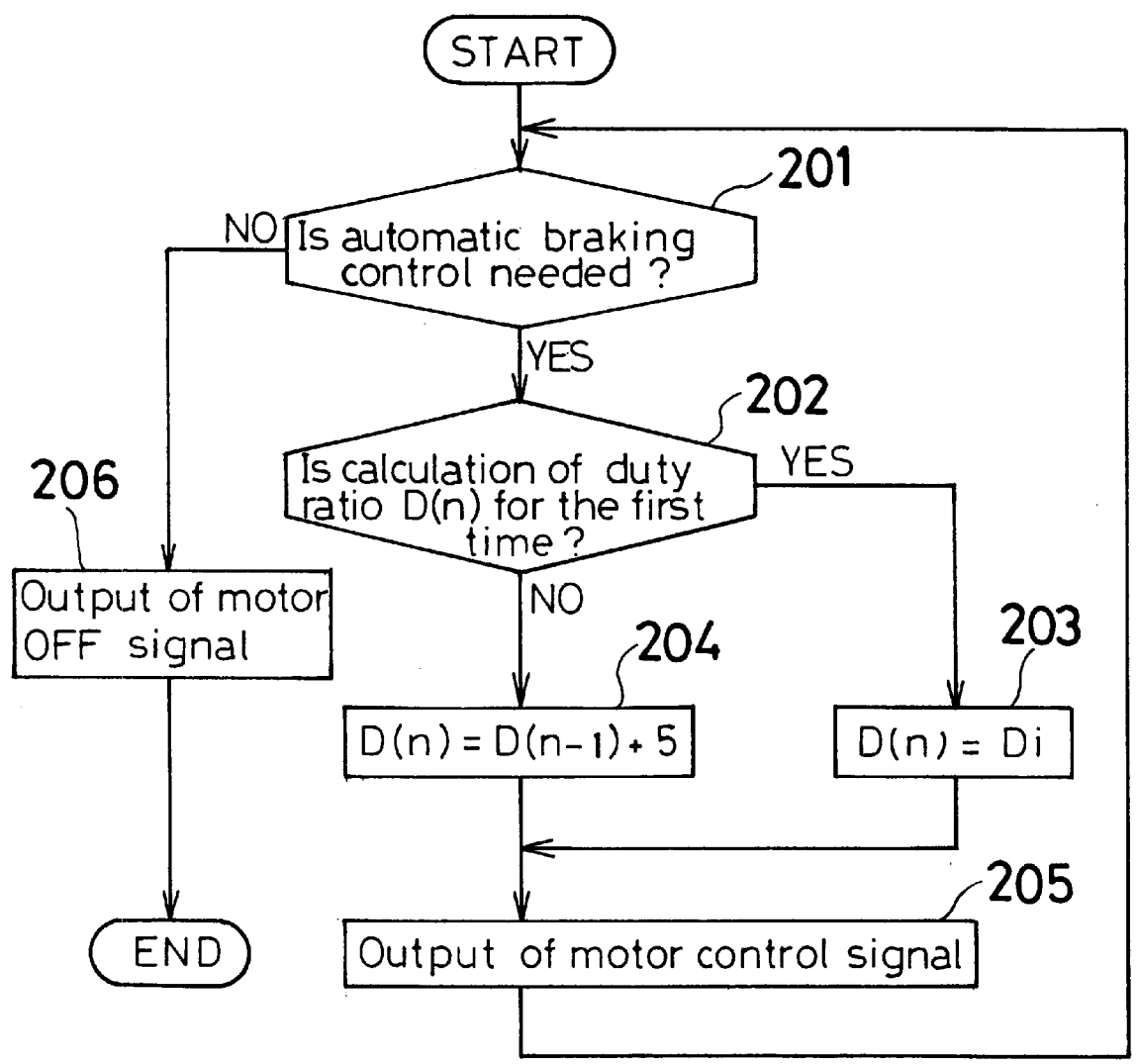
FIG. 4 is a flowchart showing the operation of an automatic braking control of the electronic controller shown in FIG. 2.

Thereafter, in Step 105, the duty ratio D for the motor 23 is set on the basis of the M/C pressure change rate A. As shown in FIG. 4, the duty ratio D is set to be increased in proportion to the increase of the M/C pressure change rate A when the M/C pressure change rate A is positive. Further, the duty ratio D is set to a constant value (10) when the M/C pressure change rate A is negative or 0. The duty ratio D for the motor 23 corresponds to a ratio of a motor ON duration relative to one cycle period (the sum of the motor ON duration and a motor OFF duration).

Then, the program proceeds to Step 106 where the duty ratio D is amended by adding the variable β (β=0 in the initial time) to thereby set an amended duty ratio Da. Then, in Step 107, a motor control signal based of the amended duty ratio Da is output to the motor 23 via the drive circuit 39a to drive the pumps 21, 22. As a result, the W/C pressure is higher than the M/C pressure. Then, in Step 108, the present W/C pressure PW(n) is input from the W/C pressure sensor S7 and the program proceeds to Step 109 where it is determined if the present W/C pressure PW(n) is lower than a desired pressure Pd which is the product of a constant α

($\alpha$>1) and the present M/C pressure PM(n). If so, the program proceeds to Step 110 where the variable $\beta$ is modified to the sum of the present variable $\beta$ and 5 and the program proceeds to Step 111 where the preceding M/C pressure PM(n−1) is set to the present M/C pressure PM(n) which has been input in Step 103. Thereafter, the processes of Steps 102 to 111 are repeated until it is determined that the W/C pressure PW(n) is not lower than the desired pressure Pd in Step 109.

If it is determined that the W/C pressure PW(n) is not lower than the desired pressure Pd in Step 109, the program proceeds to Step 112 where it is determined whether the W/C pressure PW(n) is higher than the desired pressure Pd. If so, in Step 113, the amended duty ratio Da is set to the constant value (10) and in Step 114 the motor control signal based of the constant value (10) is output to the motor 23 via the drive circuit 39a. Then, the program proceeds to Step 115 where a valve ON signal is output for a predetermined period Ts (e.g., 3 msec) to each solenoid valve (e.g., V1) via each drive circuit (e.g., 39b). The predetermined period Ts is shorter than a period until the W/C pressure PW(n) is equal to 0. Then, in Step 116, the present M/C pressure PM(n) and the present W/C pressure PW(n) are input from the pressure sensors S6, S7, respectively. Thereafter, the processes of Steps 112 to 116 are repeated until it is determined that the W/C pressure PW(n) is not higher than the desired pressure Pd in Step 112. If it is determined that the W/C pressure PW(n) is not higher than the desired pressure Pd in Step 112, the program returns to Step 101.

In Step 102, if the brake switch is determined to be turned OFF, the program proceeds to Step 117 where a motor OFF signal is output to the motor 23 via the drive circuit 39a to stop the operation of the pump 21, 22.

As aforementioned, if the W/C pressure PW(n) is lower than the desired pressure Pd [Pd=$\alpha$ PM(n)], the W/C pressure PW(n) is increased by the processes shown in Steps 102 to 111 and if the W/C pressure PW(n) is higher than the desired pressure Pd, the W/C pressure PW(n) is decreased by the processes shown in Steps 112 to 116. Therefore, the W/C pressure PW(n) can be substantially equal to the desired pressure Pd.

The program routine executed by the electronic controller 30 for the automatic braking control is explained with reference to FIG. 4.

In Step 201, it is determined if the automatic braking control is needed or if the distance to a forwardly located vehicle is shorter than a predetermined value while the vehicle is running. If so, the program proceeds to Step 202 where it is determined if the calculation of the duty ratio D(n) for the motor 23 is for the first time. If so, the program proceeds to Step 203 where the duty ratio D(n) for the motor 23 is set to an initial duty ratio Di which is a minimum value (e.g., 10).

In Step 202, if it is determined that the calculation of the duty ratio D(n) is not the first-time calculation, the program proceeds to Step 204 where the duty ratio D(n) is calculated by adding 5 to the preceding duty ratio D(n−1). For example, if the calculation of the duty ratio D(n) is the second-time calculation, the duty ratio D(n) is calculated by adding 5 to the initial duty ratio Di.

Then, the program proceeds to Step 205 where the motor control signal based on the duty ratio D(n) calculated in Step 203 or 204 is output to the motor 23 via the drive circuit 39a. Thereafter, the program proceeds to Step 201 again.

If it is determined that the automatic braking control is not needed in Step 201, the program proceeds to Step 206 where the motor OFF signal is output to the motor 23 via the drive circuit 39a to terminate the operation of the motor 23. As a result, the automatic braking control is terminated.

As aforementioned, the duty ratio D(n) for the motor 23 is increased by 5 every output timing during the automatic braking control. As a result, the W/C pressure is gradually increased, so that the wheels are prevented from being locked during the automatic braking control.

Hereinafter, the operation of the above-described hydraulic braking system is explained.

Normal Brake Operation

When the brake pedal 11 is depressed by a driver, the master cylinder 12 generates hydraulic pressure in response to the depression of the brake pedal 11. As a result, hydraulic pressure from the master cylinder 12 is supplied to the wheel brake cylinders 13, 14 via the first conduit P1 so that a braking force is applied to the front left and rear right wheels FL, RR. During this operation, the hydraulic pressure generated by the master cylinder 12 is prevented from being supplied to the sub-reservoir 24 by the check valve C4.

On the other hand, when the brake pedal 11 is completely released, the brake switch S5 is turned off and the signal is output to the electronic controller 30 so that the normally closed solenoid valves V1, V2 are opened by the electronic controller 30. As a result, the brake fluid in the wheel brake cylinders 13, 14 is returned to the master cylinder 12.

Anti-Skid Control

When the slip rate of the front left wheel FL exceeds a first threshold value during the depression of the brake pedal 11, i.e., the front left wheel FL tends to be locked, the motor 23 is operated to drive the pump 21 and the solenoid valve V1 is opened by the electronic controller 30. As a result, the front left wheel brake cylinder 13 is communicated with the sub-reservoir 24 via the second conduit P2 so that the brake fluid in the wheel brake cylinder 13 is discharged to the sub-reservoir 24. At this time, the hydraulic pressure generated by the master cylinder 12 and the hydraulic pressure pressurized by the pump 21 are supplied to the sub-reservoir 24 via the second conduit P2, since the hydraulic pressure in the sub-reservoir 24 is lower than the hydraulic pressure in the wheel brake cylinder 13. Thus, the hydraulic pressure in the wheel brake cylinder 13 can be decreased. During this operation, the brake fluid in the sub-reservoir 24 is drawn by the pump 21.

On the other hand, when the slip rate of the front left wheel FL is lower than a second threshold value which is lower than the first threshold value, the solenoid valve V1 is closed by the electronic controller 30. As a result, the wheel brake cylinder 13 is disconnected from the sub-reservoir 24. Thus, the hydraulic pressure of the master cylinder 12 is supplied to the wheel brake cylinder 13. The hydraulic pressure drawn and pressurized from the sub-reservoir 24 by the pump 21 is also supplied to the wheel brake cylinder 13, so that the hydraulic pressure in the wheel brake cylinder 13 is increased.

The anti-skid control can be carried out by opening/closing the solenoid valve V1 while the pump 21 is operated.

Traction Control

When a slip rate of the front left wheel FL as one of the driven wheels exceeds a threshold value during the depression of the acceleration pedal, the motor 23 is operated to drive the pump 21 by the electronic controller 30. As a result, the brake fluid of the master reservoir 26 is drawn by the pump 21 via the master cylinder 12 and the main conduit P11 and is pumped to the wheel brake cylinder 13 via the branch conduit P12. At this time, if brake fluid is left in the sub-reservoir 24, the brake fluid of the sub-reservoir 24 is also drawn and pumped to the wheel brake cylinder 13 by the pump 21. At this time, since the solenoid valve V1 for the front left wheel FL is closed, the brake fluid drawn and pressurized by the pump 21 is prevented from being supplied to the sub-reservoir 24 via the second conduit P2. Thus, the hydraulic pressure in the wheel brake cylinder 13 can be increased.

On the other hand, when the slip rate of the front left wheel FL is lower than another threshold value which is lower than the aforementioned threshold value, the solenoid valve V1 is opened by the electronic controller 30. As a result, the wheel brake cylinder 13 is communicated with the sub-reservoir 24 via the second conduit P2 so that the brake fluid in the wheel brake cylinder 13 is discharged to the sub-reservoir 24. At this time, the hydraulic pressure pressurized by the pump 21 is also supplied to the sub-reservoir 24 via the second conduit P2. Thus, the hydraulic pressure in the wheel brake cylinder 13 can be decreased. During this operation, the brake fluid in the sub-reservoir 24 is drawn by the pump 21.

The traction control can be carried out by operating the pump 21 and by opening/closing the solenoid valve V1.

During the traction control, the solenoid valve V2 for the rear right wheel RR as one of the non-driven wheels is opened by the electronic controller 30, whereby the hydraulic pressure in the rear right wheel brake cylinder 14 can be substantially equal to the hydraulic pressure in the sub-reservoir 24, so that the hydraulic pressure is prevented from being supplied to the rear right wheel brake cylinder 14.

Automatic Boost Control During Normal Braking

When the pedal 11 is depressed, the M/C pressure PM(n) is increased. As a result, the motor 23 is driven by the electronic controller 30 according to the duty ratio D that is set based on the increase rate A of the M/C pressure PM(n), whereby the pumps 21, 22 are operated at the speed corresponding to the rotational speed of the motor 23. If the W/C pressure PW(n) is lower than the desired pressure Pd which is the product of the constant α and the M/C pressure PM(n), the duty ratio D is changed or amended by adding 5 thereto and the motor 23 is driven according to the amended duty ratio Da. On the other hand, if the W/C pressure PW(n) is higher than the desired pressure Pd, each solenoid valve (e.g., V1) is opened for the predetermined short time Ts by the electronic controller 30, so that the W/C pressure PW(n) is decreased. Therefore, the W/C pressure PW(n) can be substantially equal to the desired pressure Pd. In other words, the W/C pressure PW(n) can be automatically boosted.

When the brake pedal 11 is released during the automatic boost control, the M/C pressure PM(n) is decreased, so that the desired pressure Pd is decreased. As a result, since the W/C pressure PW(n) is higher than the desired pressure Pd, the solenoid valves are opened for the predetermined period Ts to decrease the W/C pressure PW(n).

Automatic Braking Control

Figure 5:
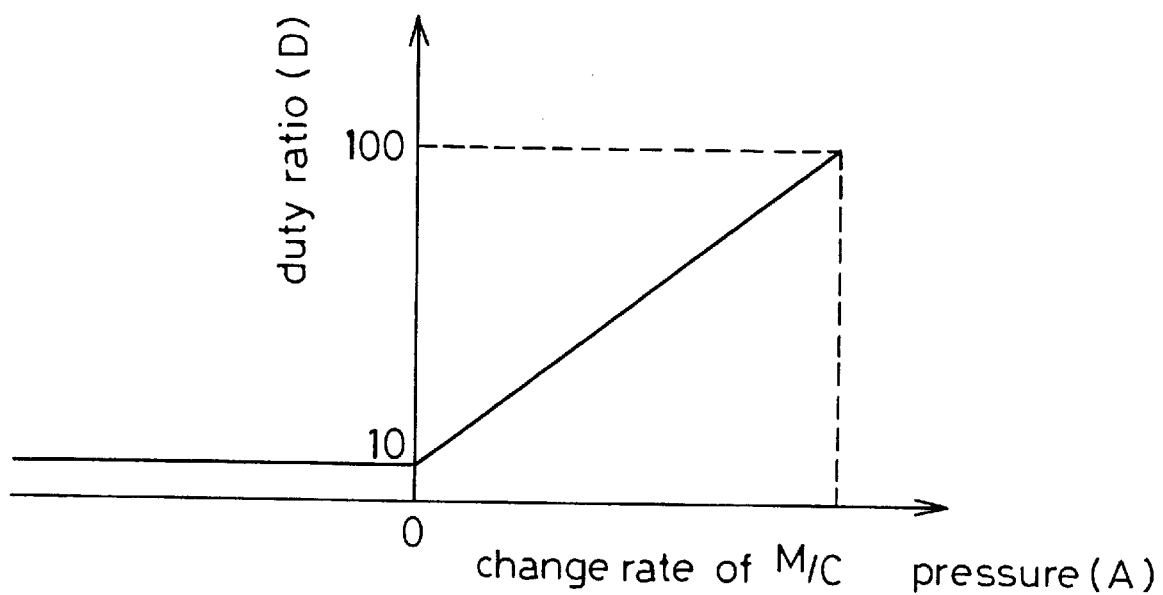
FIG. 5 is a graph showing the relationship between the increase rate of the hydraulic pressure generated by a master cylinder and the duty ratio of the motor in the first embodiment of the present invention.

When the distance to the forwardly located vehicle is shorter than the predetermined value while the vehicle is running, the motor 23 is operated and duty-controlled to gradually increase the rotational torque of the motor 23 by the electronic controller 30 as shown in FIG. 5. As a result, the brake fluid of the master reservoir 26 is gradually drawn by the pump 21 via the master cylinder 12 and pumped to the wheel brake cylinder 13 via the branch conduit P12. At this time, since the solenoid valve V1 for the front left wheel FL is closed, the brake fluid drawn and pressurized by the pump 21 is prevented from being supplied to the sub-reservoir 24 via the second conduit P2. Thus, the hydraulic pressure in the wheel brake cylinder 13 can be gradually increased.

During the automatic braking control, the hydraulic pressure of the wheel brake cylinders 13, 14 can be decreased by opening the solenoid valves V1, V2.

The hydraulic braking system of this embodiment can also carry out a front-rear braking force distribution control in which a braking force applied to the rear wheel is controlled in a certain relationship with a braking force applied to the front wheel during depression of the brake pedal 11 other than the above-described five control operations. Further, the hydraulic braking system can carry out a steering control by braking in which a braking force is applied to at least one of the wheels irrespective of depression of the brake pedal to restrain an excessive oversteer or understeer.

Figure 6:
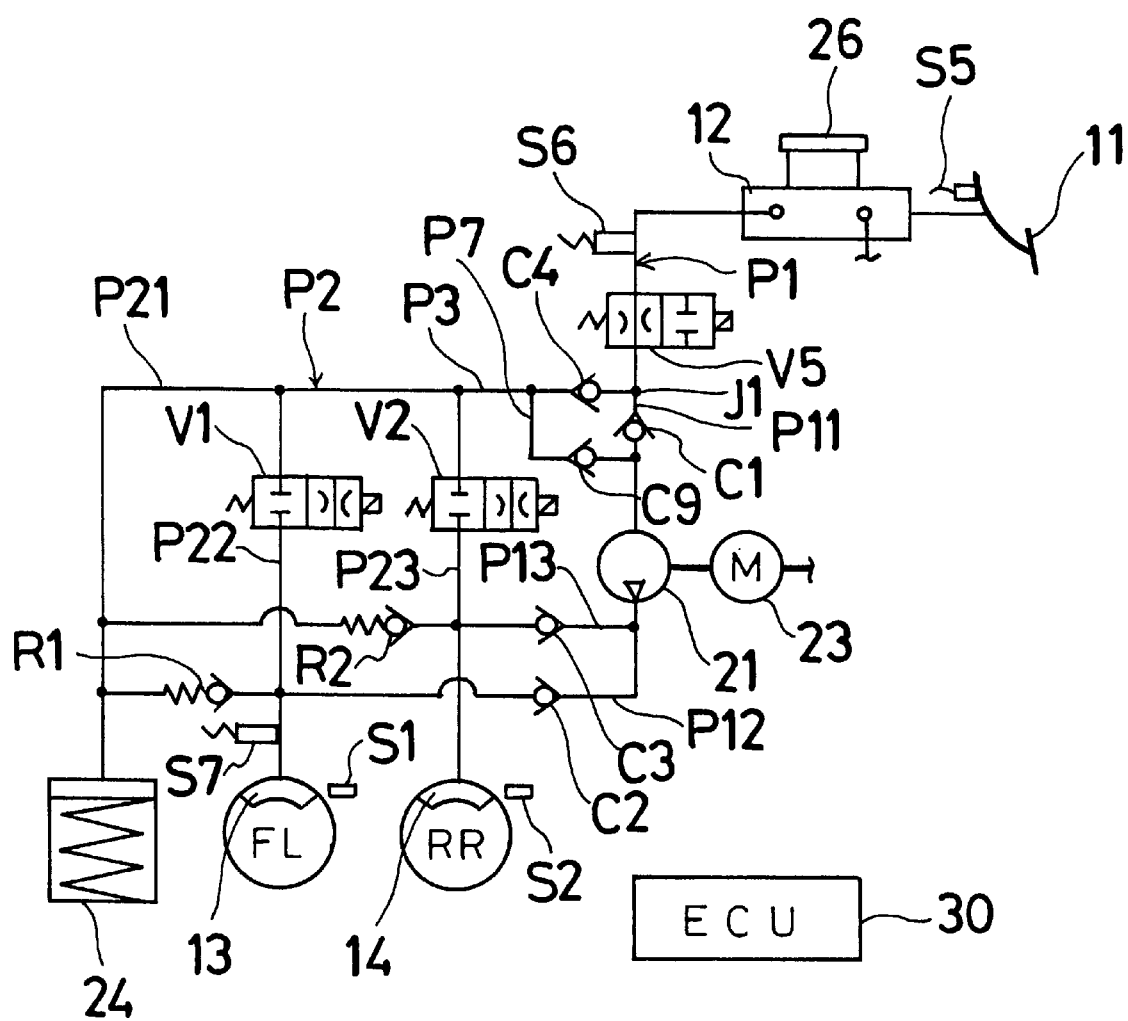
FIG. 6 is a schematic block diagram illustrating a hydraulic braking system according to a second embodiment of the present invention.

FIG. 6 illustrates a hydraulic braking system according to a second embodiment of the present invention. This second embodiment differs from the first embodiment in the following manner.

As shown in FIG. 6, a normally open solenoid valve V5 is disposed in the main conduct P11 of the first conduit P1 between the junction portion J1 and the master cylinder 12 instead of the throttle O1 used in the first embodiment. The solenoid valve V5 is closed by the electronic controller 30 during the anti-skid control of at least one of the front left wheel FL and the rear right wheel RR, so that the hydraulic pressure of the master cylinder 12 is prevented from being drawn in by the pump 21. Thus, the brake fluid in the sub-reservoir 24 can be easier to be drawn by the pump 21 during the anti-skid control.

The third conduit P3 located between the check valve C4 and a junction portion of the third conduit P3 connected to the second conduit P2 is connected to the main conduit P11 between the inlet 21a of the pump 21 and the check valve C1 via a bypass conduit P7. A check valve C9 serving as a suction valve is disposed in the bypass conduit P7. By virtue of the bypass conduit P7 and the check valve C9, the brake fluid of the sub-reservoir 24 can be rapidly drawn by the pump 21 via the bypass conduit P7.

Figure 7:
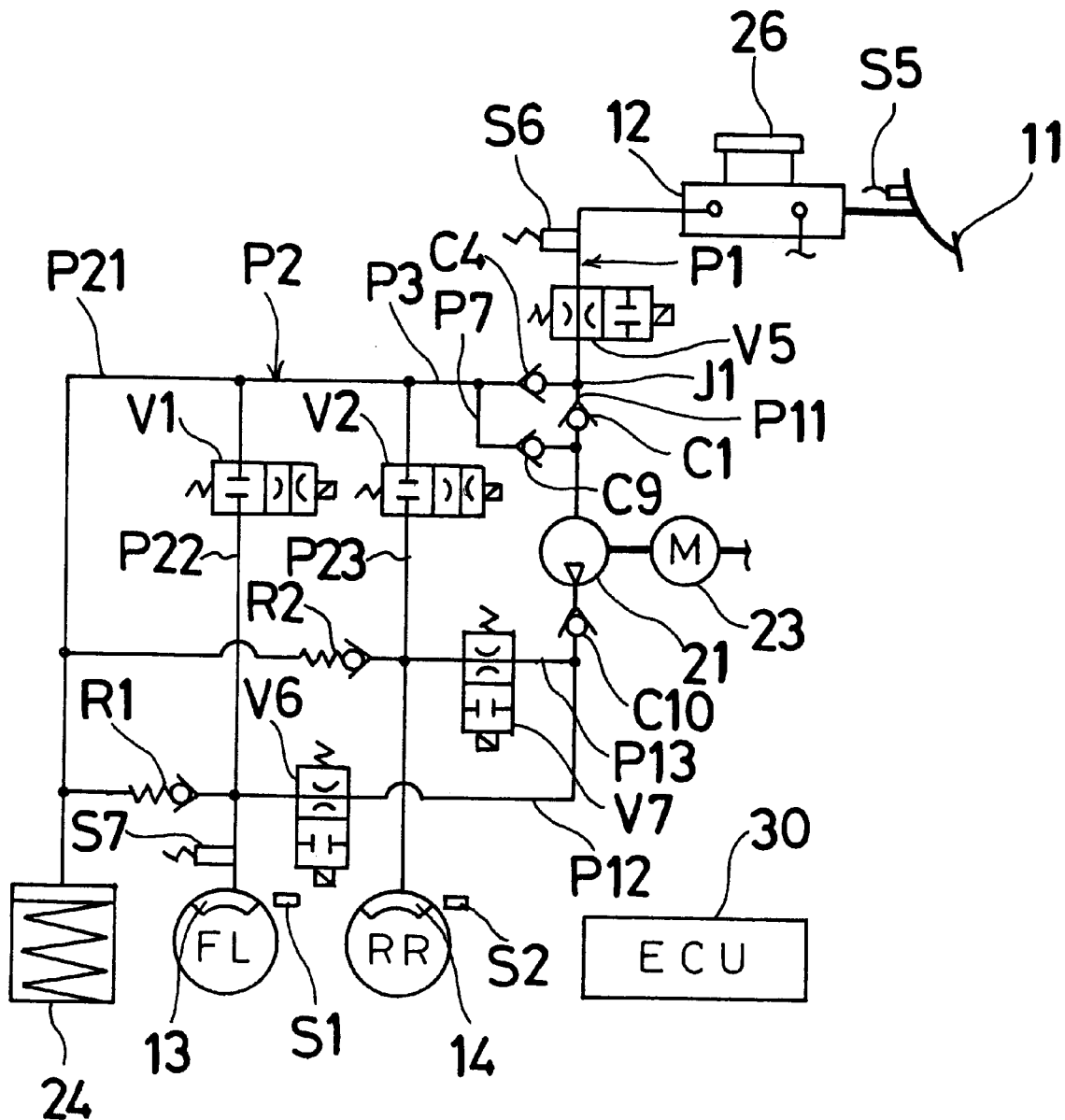
FIG. 7 is a schematic block diagram illustrating a hydraulic braking system according to a third embodiment of the present invention.

FIG. 7 illustrates a third embodiment of a hydraulic braking system according to the present invention. This third embodiment differs from the second embodiment in the following manner.

As shown in FIG. 7, normally open solenoid valves V6, V7 are disposed in the branch conducts P12, P13 of the first conduit P1, respectively instead of the check valves C2, C3 of the second embodiment. By virtue of the solenoid valves V6, V7, the hydraulic pressure in the wheel brake cylinders 13, 14 can be held. A check valve C10 serving as a discharge valve is disposed in the main conduit P11 located on the discharge side of the pump 21.

In the various embodiments described above, since the pump is disposed in the first conduit P1 for connecting the master cylinder 12 to the wheel brake cylinders 13, 14 to draw the brake fluid in the master reservoir 26 via the master cylinder 12 and to pump the brake fluid to the wheel brake cylinders 13, 14, the hydraulic pressure can be supplied to the wheel brake cylinders 13, 14 even if the brake pedal 11 is not depressed without using the conventional change over valve. Therefore, the systems embodied in the various embodiments of the present invention are less expensive and smaller in size than the conventional system.

Further, since the check valve C4 is disposed in the third conduit P3 to prevent the hydraulic pressure of the master cylinder 12 from being supplied to the sub-reservoir 24, the normal brake operation can be exactly and precisely carried out.

Further, the check valves C2, C3 are disposed in the branch conduits P12, P13, respectively to prevent the hydraulic pressure in one of the wheel brake cylinders 13(14) from being supplied to the other wheel brake cylinder 14(13). As a result, when the hydraulic pressure of one of the wheel brake cylinders 13(14) is higher than the hydraulic pressure of the other wheel brake cylinder 14(13), the higher hydraulic pressure in the one wheel brake cylinder is prevented from being supplied to the other wheel brake cylinder that is under lower hydraulic pressure.

In the present invention, the master cylinder 12 may be connected to the front wheel brake cylinders FL, FR via the first conduit P1 and may be connected to the rear wheel brake cylinders RL, RR via the fourth conduit R4.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic braking system for a vehicle having a wheel, comprising:
   a wheel brake cylinder for being operatively connected to the wheel to apply braking force to the wheel;
   a master cylinder for generating a hydraulic pressure in response to depression of a brake pedal and for supplying the hydraulic pressure to the wheel brake cylinder;
   a first conduit connecting the master cylinder to the wheel brake cylinder;
   a reservoir for storing brake fluid;
   a second conduit connecting the wheel brake cylinder to the reservoir;
   a normally closed solenoid valve disposed in the second conduit;
   a hydraulic pressure pump disposed in the first conduit, said hydraulic pressure pump including an inlet connected to the master cylinder and an outlet connected to the wheel brake cylinder, with hydraulic pressure being transmitted from the master cylinder to the wheel brake cylinder through the first conduit and the hydraulic pressure pump when the master cylinder is operated in response to brake pedal actuation; and
   a third conduit connecting the second conduit at a point between the normally closed solenoid valve and the reservoir to the first conduit at a point between the inlet of the hydraulic pressure pump and the master cylinder.

2. A hydraulic braking system for a vehicle according to claim 1, further including a check valve disposed in the third conduit for preventing the hydraulic pressure generated by the master cylinder from being supplied to the reservoir via the third conduit.

3. A hydraulic braking system for a vehicle according to claim 1, including a controller operatively associated with the normally closed solenoid valve to open the normally closed solenoid valve when it is necessary to decrease the hydraulic pressure in the wheel brake cylinder.

4. A hydraulic braking system for a vehicle according to claim 1, further including a throttle disposed in the first conduit between a junction portion at which the first conduit is connected to the third conduit and the master cylinder.

5. A hydraulic braking system for a vehicle according to claim 1, further including a normally open solenoid valve disposed in the first conduit between a junction portion at which the first conduit is connected to the third conduit and the master cylinder for disconnecting the inlet of the hydraulic pressure pump from the master cylinder during an anti-skid control.

6. A hydraulic braking system for a vehicle according to claim 1, further including a normally open solenoid valve disposed in the first conduit between the outlet of the hydraulic pressure pump and the wheel brake cylinder.

7. A hydraulic braking system for a vehicle having a first wheel and a second wheel, comprising:
   a first wheel brake cylinder for being operatively connected to the first wheel for applying braking force to the first wheel;
   a second wheel brake cylinder for being operatively connected to the second wheel for applying braking force to the second wheel;
   a master cylinder for generating a hydraulic pressure in response to depression of a brake pedal and for supplying the hydraulic pressure to the first and second wheel brake cylinders;
   a first conduit connecting the master cylinder to the first and second wheel brake cylinders, the first conduit including a main conduit connected to the master cylinder, a first branch conduit branching from the main conduit and connected to the first wheel brake cylinder for directing hydraulic pressure from the main conduit to the first wheel brake cylinder, and a second branch conduit branching from the main conduit and connected to the second wheel brake cylinder for directing hydraulic pressure from the main conduit to the second wheel brake cylinder;
   a reservoir for storing brake fluid;
   a second conduit connecting the first wheel brake cylinder to the reservoir;
   a third conduit connecting the second wheel brake cylinder to the reservoir;
   a first normally closed solenoid valve disposed in the second conduit;
   a second normally closed solenoid valve disposed in the third conduit;
   a hydraulic pressure pump disposed in the main conduit of the first conduit, the hydraulic pressure pump including an inlet connected to the master cylinder and an outlet connected to the first and second wheel brake cylinders, with hydraulic pressure being transmitted from the master cylinder to the wheel brake cylinder through the first conduit and the hydraulic pressure pump when the master cylinder is operated in response to brake pedal actuation; and
   a fourth conduit connecting both the second conduit at a point between the first normally closed solenoid valve and the reservoir and the third conduit at a point between the second normally closed solenoid valve and the reservoir to the main conduit of the first conduit at a point between the inlet of the hydraulic pressure pump and the master cylinder.

8. A hydraulic braking system for a vehicle according to claim 7, including a check valve disposed in the fourth conduit for preventing the hydraulic pressure generated by the master cylinder from being supplied to the reservoir via the fourth conduit.

9. A hydraulic braking system for a vehicle according to claim 7, further including a first check valve disposed in the first branch conduit of the first conduit for preventing brake fluid in the first wheel brake cylinder from flowing into the second wheel brake cylinder via the first and second branch conduits, and a second check valve disposed in the second branch conduit for preventing brake fluid in the second wheel brake cylinder from flowing into the first wheel brake cylinder via the first and second branch conduits.

10. A hydraulic braking system for a vehicle according to claim 7, including a controller operatively associated with the first and second normally closed solenoid valves to open the first and second normally closed solenoid valves when it is necessary to decrease the hydraulic pressure in the first and second wheel brake cylinders, respectively.

11. A hydraulic braking system for a vehicle according to claim 7, including a throttle disposed in the main conduit of the first conduit between a junction portion at which the main conduit is connected to the fourth conduit and the master cylinder.

12. A hydraulic braking system for a vehicle according to claim 7, including a normally open solenoid valve disposed in the main conduit between a junction portion at which the main conduit is connected to the fourth conduit and the master cylinder for disconnecting the inlet of the hydraulic pressure pump from the master cylinder during an anti-skid control.

13. A hydraulic braking system for a vehicle according to claim 7, including a first normally open solenoid valve disposed in the first branch conduit between the outlet of the hydraulic pressure pump and the first wheel brake cylinder and a second normally open solenoid valve disposed in the second branch conduit between the outlet of the hydraulic pressure pump and the second wheel brake cylinder.

* * * * *